(12) United States Patent
Chan et al.

(10) Patent No.: US 9,150,789 B2
(45) Date of Patent: Oct. 6, 2015

(54) SULFONATED AROMATIC POLYESTERS

(71) Applicant: E I DU PONT DE NEMOURS AND COMPANY, Wilmington, DE (US)

(72) Inventors: Justin W. Chan, Wilmington, DE (US); Michael W Cobb, Wilmington, DE (US); Surbhi Mahajan, Grove City, OH (US); Sharlene Renee Williams, Wilmington, DE (US)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 0 days.

(21) Appl. No.: 13/915,711

(22) Filed: Jun. 12, 2013

(65) Prior Publication Data
US 2013/0338332 A1 Dec. 19, 2013

Related U.S. Application Data

(60) Provisional application No. 61/660,134, filed on Jun. 15, 2012.

(51) Int. Cl.
| C08G 75/00 | (2006.01) |
| C09K 21/14 | (2006.01) |
| C08G 73/16 | (2006.01) |
| C08G 18/08 | (2006.01) |

(52) U.S. Cl.
CPC ............ C09K 21/14 (2013.01); C08G 18/0828 (2013.01); C08G 73/16 (2013.01)

(58) Field of Classification Search
CPC ..... C08G 73/16; C08G 18/0828; C09K 21/14
USPC ......... 528/173, 373, 271, 289, 362, 363, 332; 524/104, 173; 521/128, 80, 183; 264/184
See application file for complete search history.

(56) References Cited

U.S. PATENT DOCUMENTS

| 4,898,924 | A | 2/1990 | Chenevey et al. |
| 4,939,235 | A | 7/1990 | Harvey et al. |
| 4,963,428 | A | 10/1990 | Harvey et al. |
| 5,367,042 | A | 11/1994 | Pierini et al. |
| 2009/0043068 | A1* | 2/2009 | Capehart et al. .............. 528/171 |

FOREIGN PATENT DOCUMENTS

JP 09228145 A * 9/1997 ................ D01F 6/84

OTHER PUBLICATIONS

U.S. Appl. No. 13/915,696, filed Jun. 12, 2013.
U.S. Appl. No. 13/915,704, filed Jun. 12, 2013.

* cited by examiner

*Primary Examiner* — Shane Fang

(57) ABSTRACT

The invention is directed to sulfonated aromatic polyesters and methods of making said polymers. These polymers are useful as fibers and other articles. The polymer has a property of increased flame retardancy.

9 Claims, No Drawings

SULFONATED AROMATIC POLYESTERS

RELATED APPLICATIONS

This application claims the benefit of priority of U.S. Provisional Application No. 61/660134 filed on Jun. 15, 2012, the entirety of which is herein incorporated by reference.

FIELD OF THE INVENTION

The invention is directed to sulfonated aromatic polyesters and methods of making said polymers. These polymers are useful as fibers are other articles with increased flame retardancy and dyeability.

BACKGROUND

Workers that can be exposed to flames, high temperatures, and/or electrical arcs and the like, need protective clothing and articles made from thermally resistant fabrics. Any increase in the effectiveness of these protective articles, or any increase in the comfort, durability, and dyeability of these articles while maintaining protection performance, is welcomed.

Poly(trimethylene terephthalate) (3GT) polyester is a unique polymer that is useful in many materials and products in which polyesters are currently used, for example, films, carpet fibers, textile fibers, miscellaneous industrial fibers, containers and packaging. Additionally, one of the monomers used to prepare 3GT, 1,3-propanediol, is available from renewable resources. However, flame resistance is desired in many application. One method to improve flammability is the use of sulfonated monomers. Sulfonated monomers also provide materials that are easier to dye.

There is a need for 3GT derivatives with a high degree of sulfonation, leading to improved properties such as increased flame retardancy and enhanced dyeability.

SUMMARY

Disclosed is a polymer comprising repeat units of Formula (I):

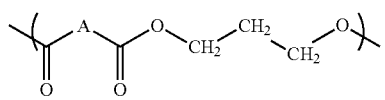

(I)

wherein A is a radical of Formula (II), (IIa) or (IIb):

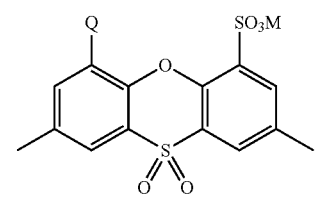

(II)

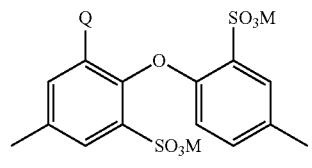

(IIa)

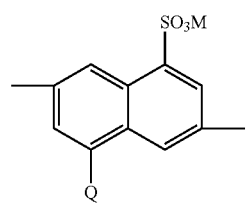

(IIb)

and wherein Q is H or SO$_3$M and M is one or more cations.

Also disclosed is a shaped article such as a fiber made from the polymer.

DETAILED DESCRIPTION

Disclosed is a polymer comprising repeat units of Formula (I):

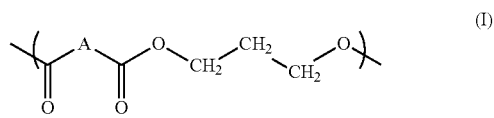

(I)

wherein A is a radical of Formula (II), (IIa) or (IIb):

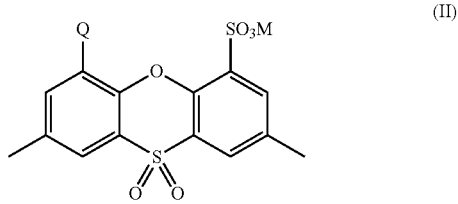

(II)

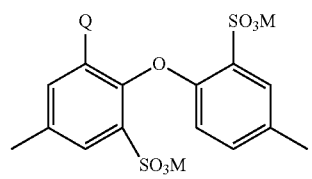

(IIa)

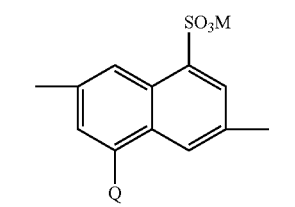

(IIb)

and wherein Q is H or SO$_3$M and M is one or more cations.

In one embodiment, M is H, Li, Na, K or NH$_4$, typically H or Na. M can be converted to another M at any time, including before or after the polymer is converted to a shaped article. When M is H, the polymer can be neutralized by contact with a salt, such as but not limited to sodium bicarbonate, sodium hydroxide, cesium hydroxide, lithium hydroxide, potassium hydroxide, or potassium carbonate.

In one embodiment A is a radical of Formula (II), or Formula (IIa), or Formula (IIb), or Formula (II) and Formula (IIa).

The polymer can comprise repeating units wherein A is a radical of Formula (II) only, Formula (IIa) only, or a the polymer can comprise a mixture of repeating units wherein A is a radical of Formula (II) and Formula (IIa).

In one embodiment the polymer can additionally comprise repeating units of Formula (Ia)

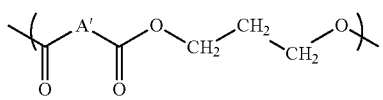

(Ia)

wherein A' is a radical of Formula (III) or (IIIa).

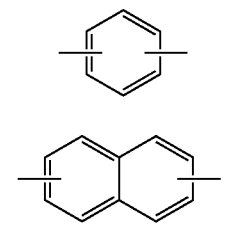

(III)

(IIIa)

In Formula (III) the substituents can be para, meta, and/or ortho, but is typically meta and/or para; more typically only para. In Formula (IIIa) the substituents can be located in any position on each ring; one on each ring. Typically they are located at the 2 and 6 position.

The polymer can comprise repeating units wherein A is a radical of Formula (III) only, Formula (IIIa) only, or can comprise a mixture of repeating units wherein A is a radical of Formula (III) and Formula (IIIa).

In one embodiment the polymer comprises about 1 to about 30, or about 5 to about 20, or about 10 to about 15 mole percent, of repeat units of Formula (I) and about 70 to about 99, or about 80 to about 95, or about 85 to about 90 mole percent mole percent of repeat units of Formula (Ia).

The polymers described herein can be prepared by methods known in the art, particularly those known to prepare polyester condensation polymers, via the reaction of 1,3-propanediol with the sulfonated aromatic diacid or diester monomers of Formula (IV), (IVa) or (IVb):

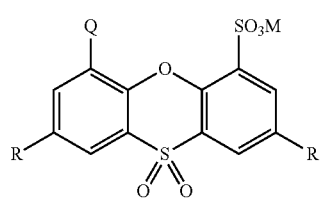

(IV)

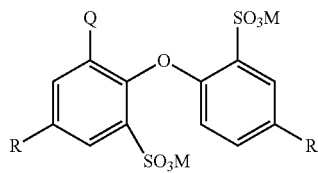

(IVa)

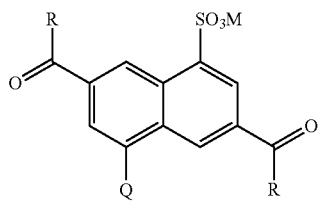

(IVb)

wherein
Q is H or $SO_3M$;
M is one or more cations; and
each R is independently $CO_2H$, $CO_2R^1$, or salts thereof, where $R^1$ is an 1-5 carbon alkyl group.
M is typically a monovalent cation such as H, Li, Na, K, or $NH_4$, or mixture thereof, but is typically H or Na.

The polymerization can be performed with the closed ring structure of Formula (IV), the open ring structure of Formula (IVa), or a mixture of both. Additionally, Q can be either H or $SO_3M$, or a mixture.

The sulfonated aromatic diacids can be prepared by any method known in the art. One method is via the sulfonation of the corresponding aromatic acids. One synthesis is disclosed in co-pending U.S. Pat. Appl. 61/423616 and U.S. Patent Application No. 61/660101. As therein described, the sufonated aromatic diacids are made by adding a oleum to an aromatic acid, such as 4,4'-oxybis(benzoic acid) or naphthalene dicarboxylic acid, in the presence of heat. They may be purified by recrystallization or other methods known to those skilled in the art.

Suitable methods to prepare the polymers are via (a) the transesterification of the ester forms of Formula (IV) or (IVa) with 1,3-propanediol, or by the esterification of the acid forms of Formula (IV) or (IVa) with 1,3-propanediol, followed by (b) polycondensation. Both of these methods are well known in the art.

Generally, in the transesterification reaction, the ester forms of Formula (IV) or (IVa) and 1,3-propanediol are reacted in the presence of a transesterification catalyst at elevated temperature and atmospheric pressure to form oligomer and monoalcohol byproduct. In the esterification reaction, the acid forms of Formula (IV), (IVa) or (IVb) and 1,3-propanediol are reacted in the optional presence of an esterification catalyst at elevated temperature and at atmospheric or superatmospheric pressure to form oligomer and water byproduct. The oligomer can then be polymerized at higher temperature under reduced pressure in the presence of a polycondensation catalyst to form the desired polymer.

Further embodiments of the polymer that comprise additional repeating units, such as those of Formula (Ia), can be prepared via the addition of other diacid or diester monomers to the reaction. To prepare embodiments where A' is a radical of Formula (III), the corresponding diacid such as isophthalic or terephthalic, or their diester derivatives, are used. To prepare embodiments where A' is a radical of Formula (IIIa), the corresponding naphthalene dicarboxylic acid is used.

Any customarily employed polycondensation catalyst can be used, such as tin or titanium compounds, typically organic tin or titanate compounds.

The polyester polymers described can be made into shaped articles such as fibers, films, and use as an engineering plastic. Particularly suitable uses are those for which improved flame resistant properties and dyeability are desired.

The polymer is particularly suitable for cationic dyeing, either before or after formation of a shaped article, such as a fiber. In one embodiment, the fiber is used to form a yarn. The yarn is first woven or knit into a fabric, followed by cationic dyeing of the fabric. In an alternative embodiment, the yarn is subject to cationic dyeing prior to incorporation into a fabric, in processes known, for example, as package dyeing and skein dyeing.

Basic dyes are water soluble and dissociate into anions and colored cations. The cations have a strong affinity for the sulfonic group in the polymer, and form salts. Because of these strong bonds, washfastness is usually outstanding. In the typical practice of dyeing according to the invention, the cationic dye is applied in a batch process such as skein, stock, and package dyeing, which are preferred over piece dyeing on becks or jet machines.

The polymers described herein can be formed into a shaped article, such as films, fibers for textile uses, and other articles made from engineering plastics. Particularly suitable uses are those for which improved flame resistant properties and dyeability are desired. They can be spun into fibers via melt spinning Shaped articles as described herein include extruded or blown shapes or films, molded articles, and the like. Films can be made by any known technique such as casting the dope onto a flat surface, extruding the dope through an extruder to form a film or extruding and blowing the dope film to form an extruded blown film. Typical techniques for dope film extrusion include processes similar to those used for fibers, where the polymer passes through a spinneret or die. More details describing the extrusion and orientation of a dope film can be found in Pierini et al. (U.S. Pat. No. 5,367,042); Chenevey, (U.S. Pat. No. 4,898,924); Harvey et al., (U.S. Pat. No. 4,939, 235); and Harvey et al., (U.S. Pat. No. 4,963,428).

"Fiber" is defined as a relatively flexible, unit of matter having a high ratio of length to width across its cross-sectional area perpendicular to its length. Herein, the term "fiber" is used interchangeably with the term "filament" or "end" or "continuous filament". The cross section of the filaments described herein can be any shape, such as circular or bean shaped, but is typically generally round, and is typically substantially solid and not hollow. Fiber spun onto a bobbin in a package is referred to as continuous fiber. Fiber can be cut into short lengths called staple fiber. Fiber can be cut into even smaller lengths called floc. Yarns, multifilament yarns or tows comprise a plurality of fibers. Yarn can be intertwined and/or twisted.

Fibers may be spun from solution using any number of processes, however, melt spinning is preferred for polyesters.

In this process, filaments are extruded through a hole spinneret. The filaments pass through a cooling zone, are formed into a yarn bundle, and passed over a finish applicator. The cooling zone comprises an air quench zone wherein air is impinged upon the yarn bundle at room temperature and at 60% relative humidity with a velocity of 40 feet/min. The air quench zone can be designed for so-called cross-air-quench wherein the air flows across the yarn bundle, or for so-called radial quench wherein the air source is in the middle of the converging filaments and flows radially outward over 360°. Radial quench is a more uniform and effective quench method. Following the finish applicator, the yarn is passed to a first driven godet, also known as a feed roll, set at 60 to 100° C., in one embodiment, 70 to 100° C., coupled with a separator roll. The yarn is wrapped around the first godet and separator roll 6 to 8 times. From the first godet, the yarn is passed to a second driven godet, also known as a draw roll, set at 110 to 130° C., coupled with a second separator roll. The yarn is wrapped around the second godet and separator roll 6 to 8 times. Draw roll speed is ca. 3000 m/min while the ratio of draw roll speed to feed roll speed is in the range of 1.75 to 3. From the draw rolls, the yarn is passed to a third driven godet, coupled with a third separator roll, operated at room temperature and at a speed 1-2% faster than the roll speed of the second godet roll. The yarn is wrapped around the third pair of rolls 6 to 10 times. From the third pair of rolls, the yarn can be passed through an optional interlace jet, and then to a wind-up, operated at a speed to match the output of the third pair of rolls.

In one embodiment, a plurality of filaments, each individually of the invention, are extruded through a multi-hole spinneret. The filaments so extruded are combined to form a yarn. Typically the yarn is held together by the application of some agitation, twisting, or both, of the extruded filaments, or thread line, causing the interlacing of the filaments.

The yarn so produced is then suitable for cationic dyeing. In one embodiment, the yarn is first woven or knit into a fabric, followed by cationic dyeing of the fabric. In an alternative embodiment, the yarn is subject to cationic dyeing prior to incorporation into a fabric, in processes known, for example, as package dyeing and skein dyeing.

The fibers formed from the polymers described herein are useful in a variety of applications. They are colorless, although impurities can impart discoloration, and are particularly useful as flame retardant fibers.

EXAMPLES

Unless otherwise stated, the examples were all prepared using the following procedures. Ratios of reagents are given as mole ratios. 1,3-Propanediol was obtained from E. I. du Pont de Nemours and Company, Wilmington, Del. Terephthalic acid (TPA), isophthalic acid (IPA), 4,4'-oxybis(benzoic acid) (OBBA), dimethyl terephthalate, Tyzor® TPT (titanium (IV) isopropoxide), 2,6-naphthalene dicarboxylic acid, and sulfuric acid, were obtained from Sigma-Aldrich®. Methanol (MeOH) was obtained from BDH. Acetonitrile was obtained from EMD Chemicals.

Example 1

Sulfonylated 4,4'-oxybis(benzoic acid)

A 40 mL vial containing a magnetic stir bar was charged with 4,4'-oxybis(benzoic acid) (6.0 g) and 30% oleum (39.6 g). The mixture was heated in a 130° C. hot block for 3 days. Samples (1 mL) of the resulting clear brown solution were then quenched with water and vortexed to mix. The precipitated solids were filtered and sparingly washed with ice water. The remaining solid was predominately the monosulfonated sulfone product and the aqueous filtrate predominately contained the disulfonated sulfone. $^1$H NMR spectrum and LC/MS were performed and indicate that the desired sulfonated and sulfonylated products were formed.

A saturated solution of the monosulfonated sulfone product was prepared in water-$d_2$ containing a trace of sodium 3-trimethylsilylpropionate-$d_4$ as a chemical shift referent. The solution was inserted in a NMR probe and heated to 60° C. to ensure dissolution. A series of NMR two dimensional correlation experiments were performed to elucidate the structure of the material. These experiments permitted assignment of the $^1$H resonances of the primary product, 4-sulfophenoxathiine-2,8-dicarboxylic acid 10,10-dioxide. The $^1$H assignments (in ppm relative to chemical shift referent at 0.00 ppm) are shown in the following below.

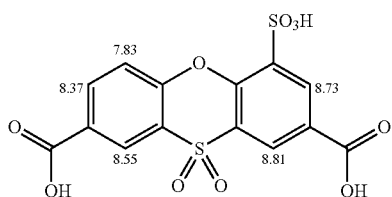 [SMILES: O=C(O)c1ccc2c(c1)S(=O)(=O)c1cc(C(=O)O)cc(S(=O)(=O)O)c1O2]

Example 2

Synthesis and Proof of Structure of sulfonylated 4,4'-oxybis(benzoic acid) dimethyl ester A 200 mL round-bottom flask containing a magnetic stir bar was charged with sulfonated 4,4'-oxybis(benzoic acid) (6.0 g), methanol, and sulfuric acid (39.6 g). The solids dissolved at room temperature into a clear solution. The solution was placed in a 90° C. oil bath for 24 hours. The solvent was removed via rotary evaporation to yield a yellow solid, which was then repeatedly washed with acetonitrile and water. The solid was then recrystallized from methanol. The solid was dried in a vacuum oven for 18 hours at 125° C. The structure was confirmed via LC-MS, $^1$H NMR, and X-ray crystallography. The $^1$H assignments (in ppm relative to chemical shift referent at 0.00 ppm) are shown below.

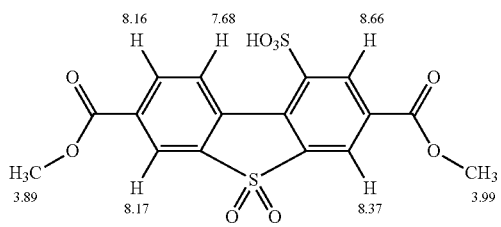

Example 3

Polyester Containing Sulfonated OBBA Dimethylester

Dimethylterephthalate (50.44 g, 0.26 mol) and sulfonated OBBA dimethylester (11.14 g, 0.026 mol) from Example 2 were charged to a 250 mL three-necked round bottom flask. An overhead stirrer and a distillation condenser were attached. The reaction mass was kept under a static $N_2$ atmosphere. The contents were degassed once by evacuating down to 100 mtorr and refilling back with $N_2$ gas. To this, 1,3-propanediol (39.18 g, 0.51 mol) was added. The contents were degassed again twice. At the second degas step the overhead stirrer was turned on at a speed of 3 rpm. The flask was immersed in a preheated metal bath set at 160° C. The stirrer speed was slowly increased to 180 rpm and the solids were allowed to completely melt at 160° C. 210 µL of catalyst Tyzor®TPT was added under a $N_2$ blanket. The temperature was increased to 210° C. The system was maintained at 210° C. for 60 minutes to distill off most of the methanol produced. The temperature was increased to 250° C. and was held constant for 30 minutes. The nitrogen flush was closed off and vacuum ramp was started. After 17 min, the vacuum reached a value of 67 mtorr. The reaction was maintained under vacuum for approximately 65 min. The polymer obtained was a brown solid that was glass-like and brittle. The $^1$H NMR revealed additional peaks that indicated that the monomer from Example 2 was incorporated.

Example 4

Sulfonation of 2,6-naphthalene dicarboxylic acid 2,6-Naphthalene dicarboxylic acid (0.5053 g, Aldrich) was added to 27.9 g of 18.7% oleum. The material was heated to 130° C. and reacted with stirring by magnetic bar for 30 minutes. The reaction was removed from heat and allowed to cool to room temperature. $^1$H NMR spectrum and LC/MS were performed and indicate that the desired sulfonated products were formed. A saturated solution of the monosulfonated sulfone product was prepared in water-$d_2$ containing a trace of sodium 3-trimethylsilylpropionate-$d_4$ as a chemical shift referent. The solution was inserted in a NMR probe. Literature comparison permitted assignment of the $^1$H resonances of the primary disulfonated product. The $^1$H assignments (in ppm relative to chemical shift referent at 0.00 ppm) are shown in the following below.

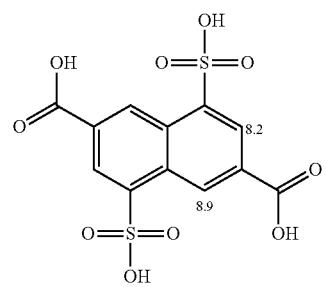 [SMILES: O=C(O)c1cc(S(=O)(=O)O)c2cc(C(=O)O)cc(S(=O)(=O)O)c2c1]

What is claimed is:
1. A polymer comprising repeat units of Formula (I):

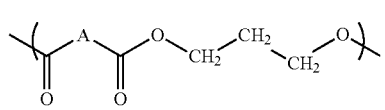

wherein A is a radical of Formula (II) or (IIa):

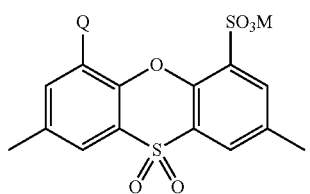

-continued

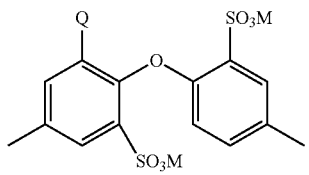
(IIa)

and wherein Q is H and M is one or more cations.

2. The polymer of claim 1 wherein M is H, Li, Na, K or NH$_4$, or mixture thereof.

3. The polymer of claim 1 wherein M is H or Na.

4. The polymer of claim 1 further comprising repeating units of Formula (Ia)

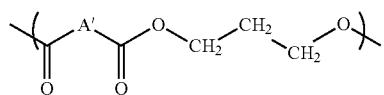
(Ia)

wherein A' is a radical of Formula (III).

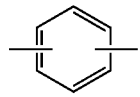
(III)

5. The polymer of claim 4 comprising about 1 to about 30 mole percent of repeat units of Formula (I) and about 70 to about 99 mole percent of repeat units of Formula (Ia).

6. The polymer of claim 4 comprising about 5 to about 20 mole percent of repeat units of Formula (I) and about 80 to about 95 mole percent of repeat units of Formula (Ia).

7. A shaped article made from the polymer of claim 1.

8. The shaped article of claim 7 that is a fiber.

9. The polymer of claim 1 wherein A is a radical of Formula (II) and Formula (IIa).

\* \* \* \* \*